(12) United States Patent
Wang et al.

(10) Patent No.: US 11,740,908 B2
(45) Date of Patent: *Aug. 29, 2023

(54) SYSTEMS AND METHODS FOR DEFINING A DEPENDENCY OF PRECEDING AND SUCCEEDING INSTRUCTIONS

(71) Applicant: Arm Limited, Cambridge (GB)

(72) Inventors: Wei Wang, Cambridge (GB); Thomas Edward Shull, Urbana, IL (US)

(73) Assignee: Arm Limited, Cambridge (GB)

( * ) Notice: Subject to any disclaimer, the term of this patent is extended or adjusted under 35 U.S.C. 154(b) by 57 days.

This patent is subject to a terminal disclaimer.

(21) Appl. No.: 17/129,515

(22) Filed: Dec. 21, 2020

(65) Prior Publication Data
US 2021/0286625 A1 Sep. 16, 2021

Related U.S. Application Data

(63) Continuation-in-part of application No. 16/820,446, filed on Mar. 16, 2020.

(51) Int. Cl.
*G06F 9/38* (2018.01)
*G06F 9/30* (2018.01)
*G06F 12/0875* (2016.01)

(52) U.S. Cl.
CPC ........ *G06F 9/3838* (2013.01); *G06F 9/30043* (2013.01); *G06F 12/0875* (2013.01); *G06F 2212/451* (2013.01)

(58) Field of Classification Search
CPC .. G06F 9/3838; G06F 9/3834; G06F 9/30087; G06F 9/3004; G06F 9/30181–30196; G06F 12/0238; G06F 9/3836; G06F 9/3012; G06F 9/30047; G06F 9/544; G06F 9/30043; G06F 9/3005
See application file for complete search history.

(56) References Cited

U.S. PATENT DOCUMENTS

| | | | |
|---|---|---|---|
| 6,950,927 B1 * | 9/2005 | Apisdorf | G06F 9/3851 712/216 |
| 10,761,822 B1 * | 9/2020 | Borkovic | G06F 9/30087 |
| 2008/0059966 A1 * | 3/2008 | Du | G06F 9/3838 712/E9.046 |
| 2008/0270749 A1 * | 10/2008 | Ozer | G06F 9/3838 712/23 |
| 2009/0063823 A1 * | 3/2009 | Burky | G06F 9/3863 712/216 |
| 2014/0380024 A1 * | 12/2014 | Spadini | G06F 9/3836 712/217 |

(Continued)

*Primary Examiner* — Shawn Doman
(74) *Attorney, Agent, or Firm* — Pramudji Law Group PLLC; Ari Pramudji

(57) ABSTRACT

In a particular implementation, a method includes: receiving, at a computing device, first and second instructions of a plurality of instructions obtained from a memory, where the first instruction corresponds to a preceding instruction of a second instruction, and where the second instruction corresponds to a succeeding instruction of the first instruction; determining a dependency of the first and second instructions; sending the first and second instructions to an issue queue of the computing device; executing, at the computing device, the first and second instructions; and completing, at the computing device, the first and second instructions.

20 Claims, 10 Drawing Sheets

(56) References Cited

U.S. PATENT DOCUMENTS

Figure 2:
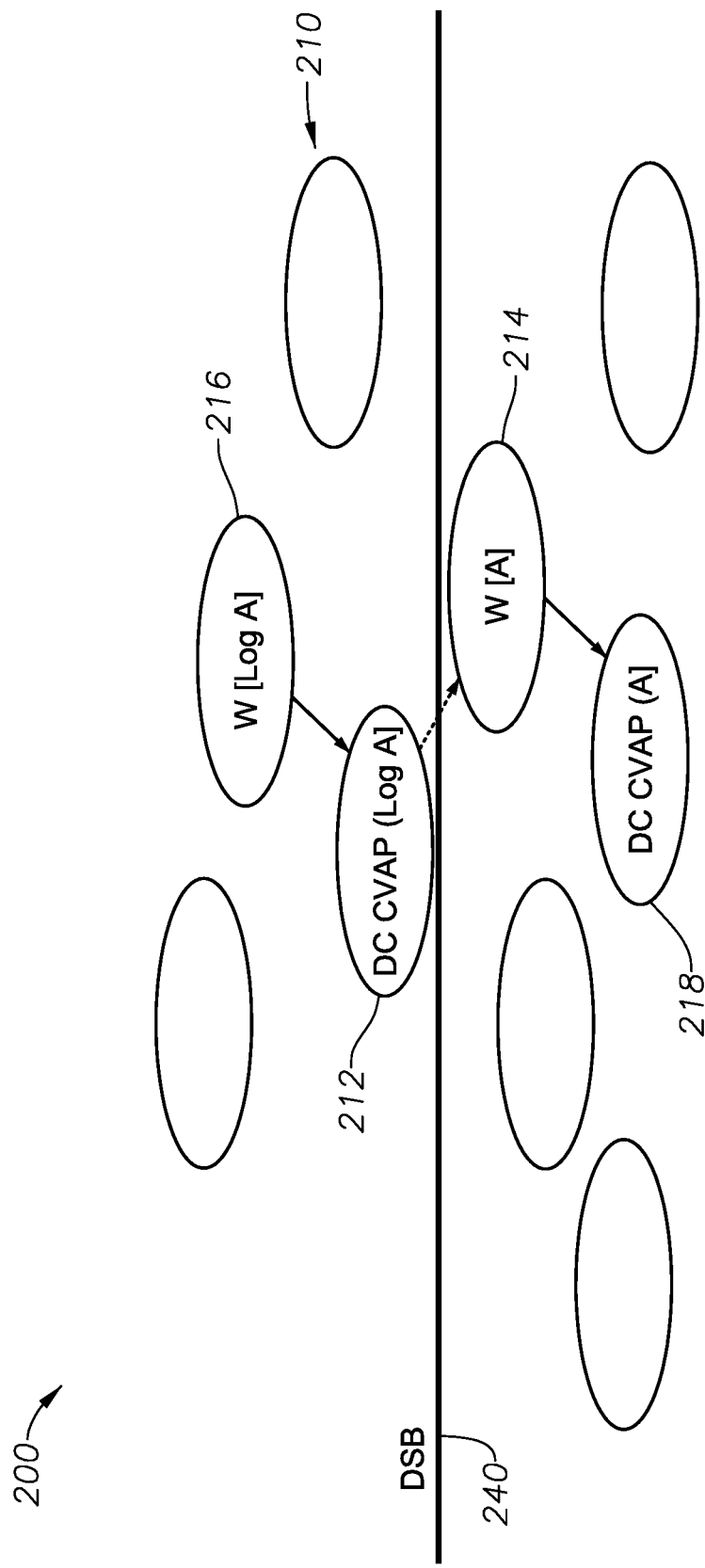

| | | | |
|---|---|---|---|
| 2015/0220341 A1* | 8/2015 | Ohannessian, Jr | G06F 9/30087 |
| | | | 712/217 |
| 2018/0011710 A1* | 1/2018 | Guo | G06F 9/3855 |
| 2018/0011893 A1* | 1/2018 | Kimura | G06F 16/278 |
| 2018/0365016 A1* | 12/2018 | Luliano | G06F 9/3834 |
| 2019/0004960 A1* | 1/2019 | Wang | G06F 12/0871 |
| 2020/0201570 A1* | 6/2020 | Kim | G06F 3/0659 |

* cited by examiner

100

1. W [Log$_A$] = [A]
2. DC CVAP [Log$_A$]
3. DSB
4. W [A] = new
5. DC CVAP [A]

FIG. 1

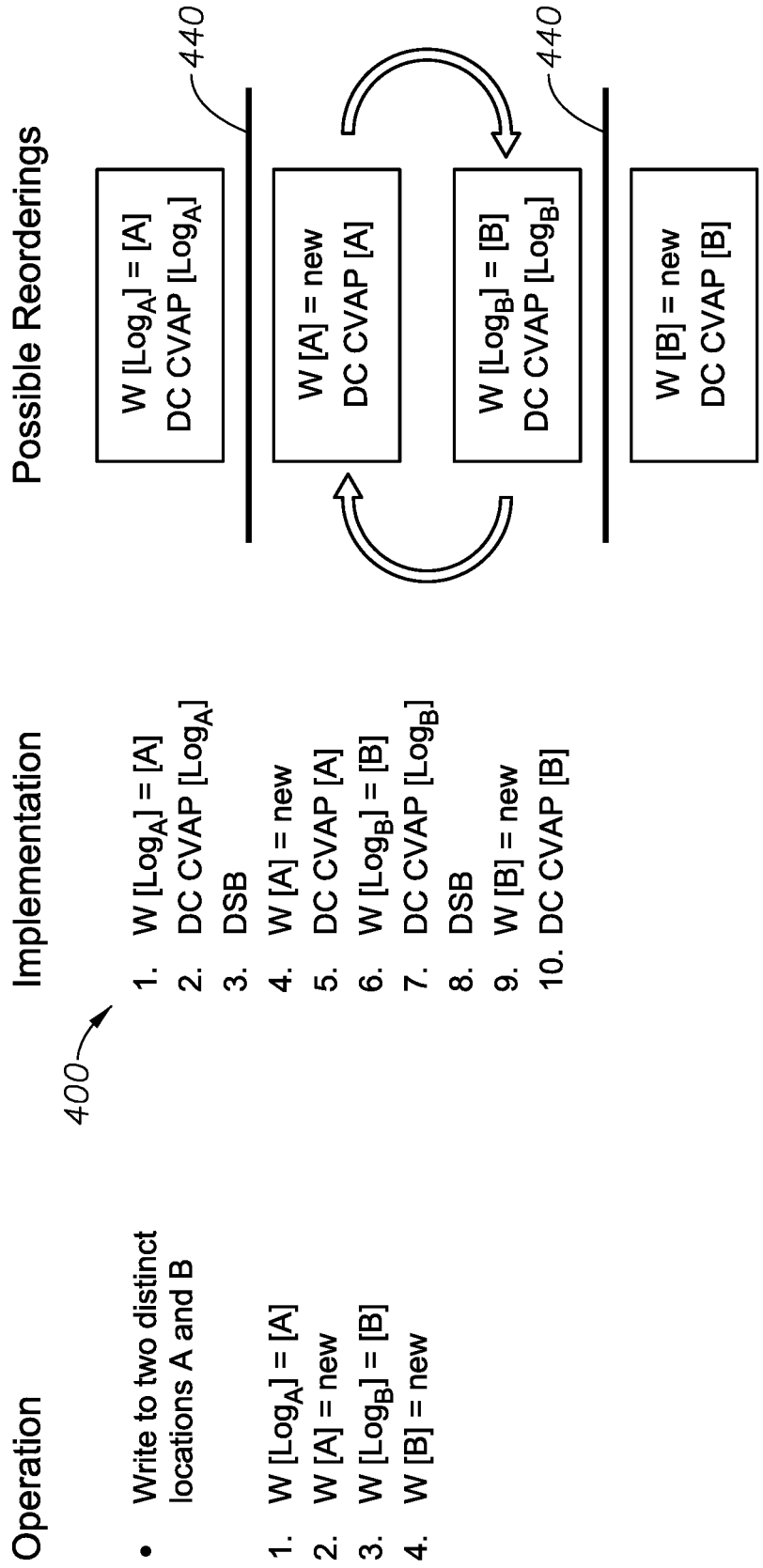

Original Code

1. W [Log$_A$] = [A]
2. DC CVAP [Log$_A$]
3. DSB
4. W [A] = new
5. DC CVAP [A]
6. W [Log$_B$] = [B]
7. DC CVAP [Log$_B$]
8. DSB
9. W [B] = new
10. DC CVAP [B]

Code Using ISA Extensions

500

1. W [Log$_A$] = [A]
2. [1,-] DC CVAP [Log$_A$]
3. [-,1] W [A] = new
4. DC CVAP [A]
5. W [Log$_B$] = [B]
6. [2,-] DC CVAP [Log$_B$]
7. [-,2] W [B] = new
8. DC CVAP [B]

Possible Reorderings

SYSTEMS AND METHODS FOR DEFINING A DEPENDENCY OF PRECEDING AND SUCCEEDING INSTRUCTIONS

I. CROSS-REFERENCE TO RELATED APPLICATIONS

This application is a continuation-in-part of U.S. patent application Ser. No. 16/820,446 filed on Mar. 16, 2020, the entire disclosure of which is incorporated herein by reference.

II. FIELD

The present disclosure is generally related to systems and methods for defining and enforcing ordered constraints.

III. DESCRIPTION OF RELATED ART

Advances in technology have resulted in smaller and more powerful computing devices. For example, a variety of portable personal computing devices, including wireless telephones, such as mobile and smart phones, tablets and laptop computers are small, lightweight, and easily carried by users. These devices can communicate voice and data packets over wireless networks. Further, many such devices incorporate additional functionality, such as a digital still camera, a digital video camera, a digital recorder, and an audio file player. Also, such devices can process executable instructions, including software applications, such as a web browser application, that can be used to access the Internet. As such, these devices can include significant computing and networking capabilities.

In present day computing systems, various scenarios may arise that can require two memory operations to be ordered relative to one another. For example, in multi-threaded programming, as locks may be utilized to guard shared data, locks guarding shared data would be required to be obtained prior to access of shared data. Currently, to ensure proper memory operation order for such memory operations, barriers may be inserted into the program code.

However, with the advent of non-volatile main memory (NVMM) as a new tier of memory systems, the quantity of such ordered memory operation scenarios may increase significantly. As NVMM is non-volatile, it may be utilized in newer sets of crash-consistent applications configured to maintain persistent state. Advantageously, such applications may perform "fine-grain" updates to persistent state significantly faster than if traditional secondary storage devices such as solid-state drives (SDD) and hard-disk drives (HDD) were utilized. Nevertheless, as such applications insert ever increasing numbers of barriers, there is an ongoing need in the art to ensure efficient proper ordering and enforcement (i.e., persistently completed operation) to the NVMM.

IV. BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, circuits or apparatuses described herein.

Figure 3:
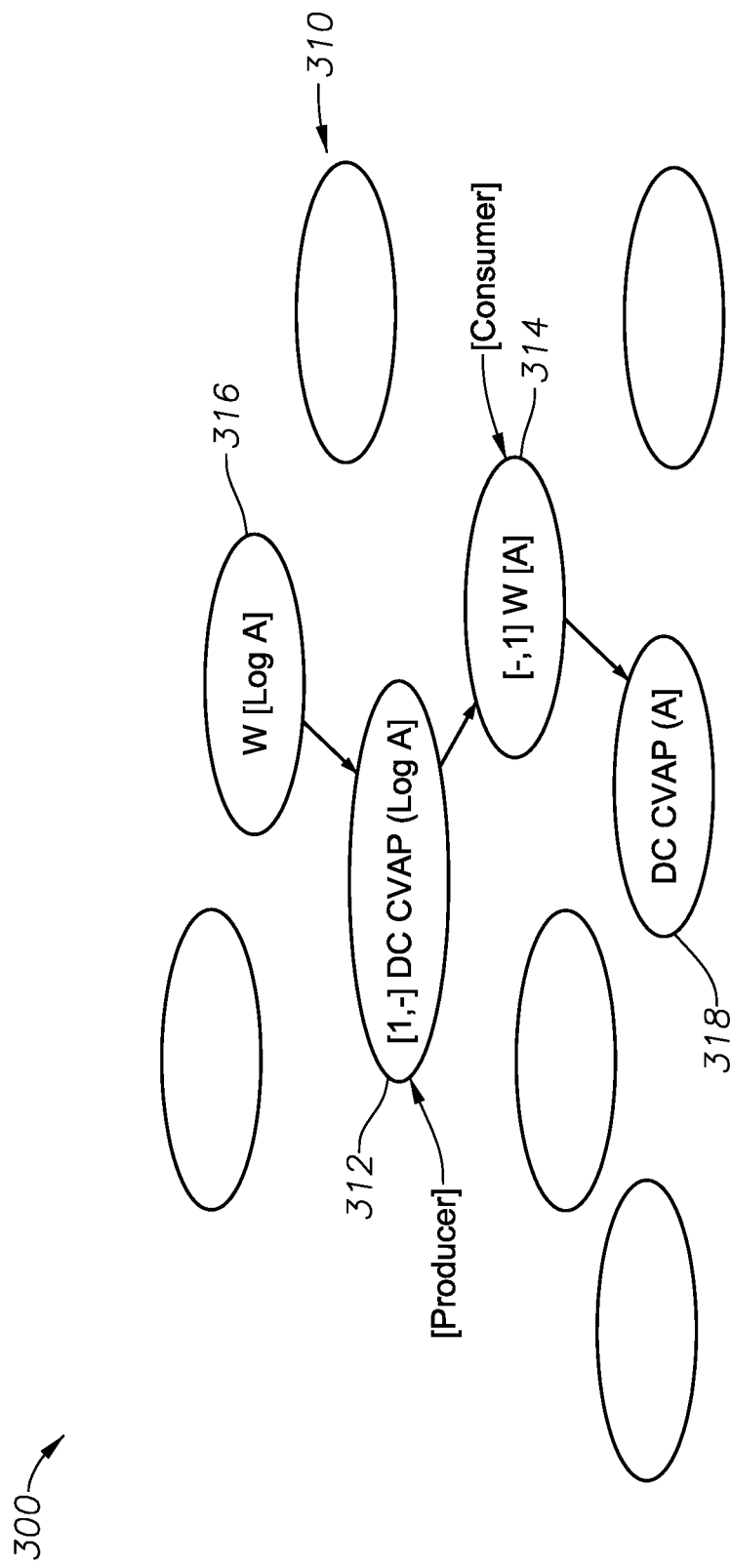
Figures 5A, 5B, 5C:
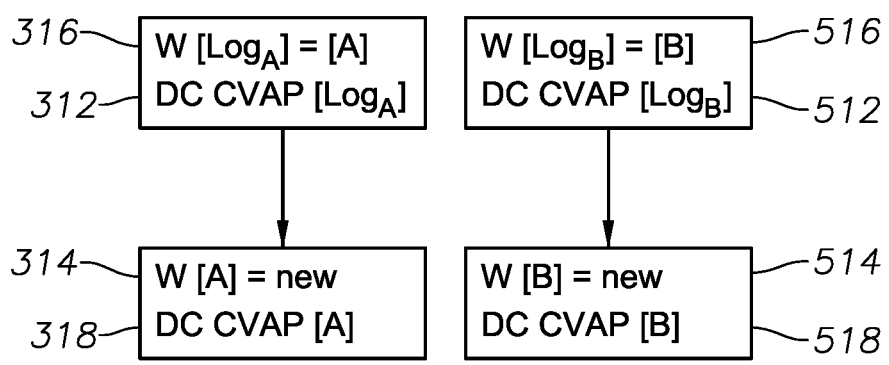
Figure 6:
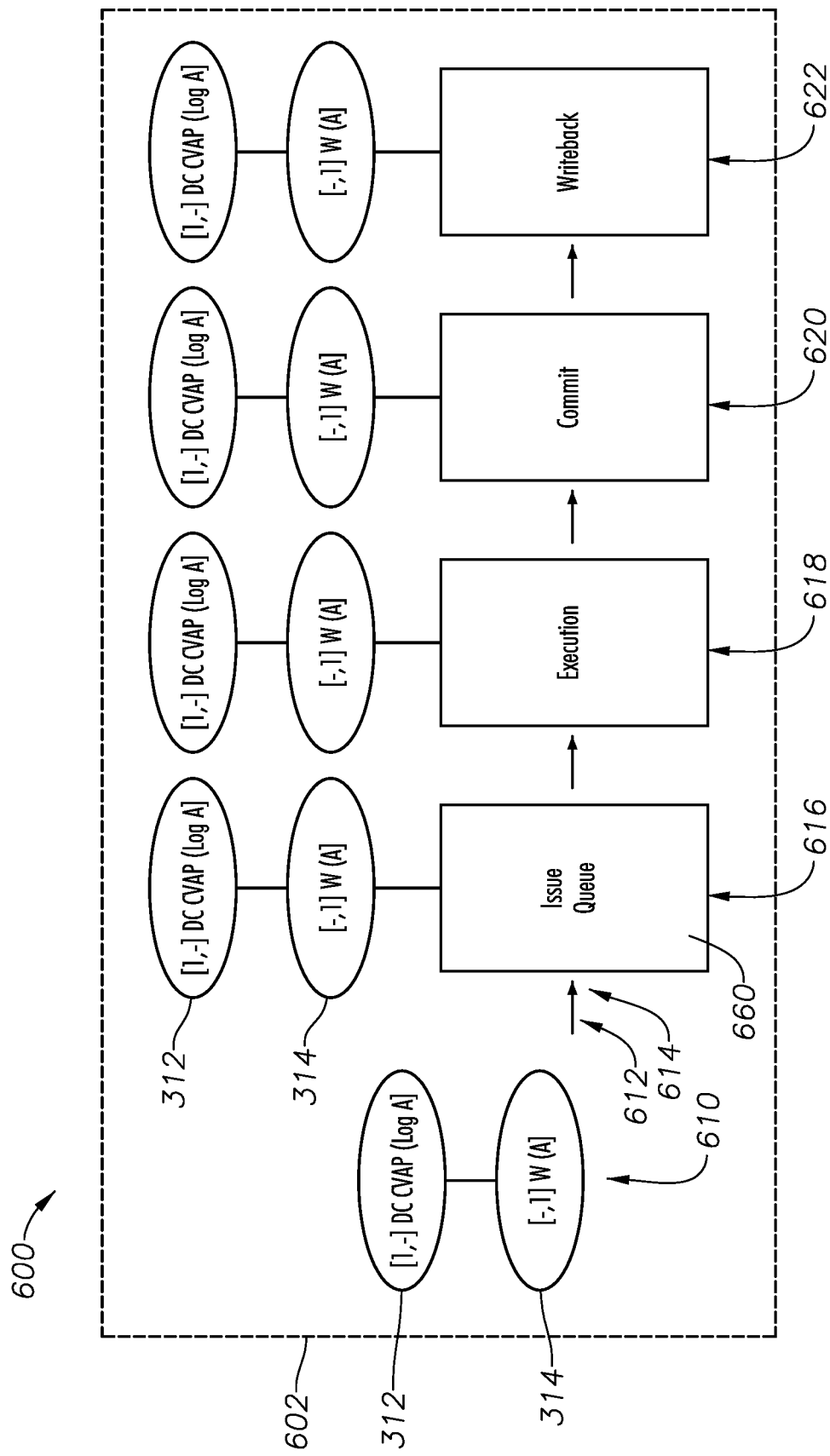
Figure 7:
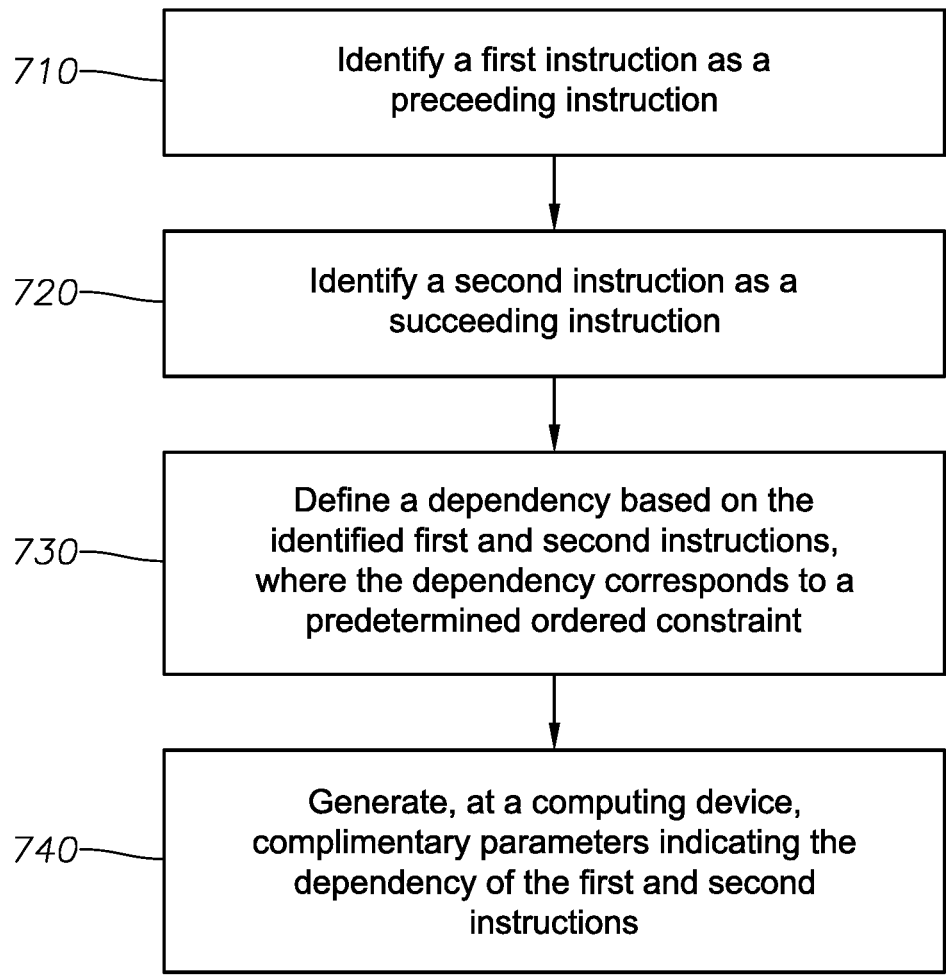
Figure 8:
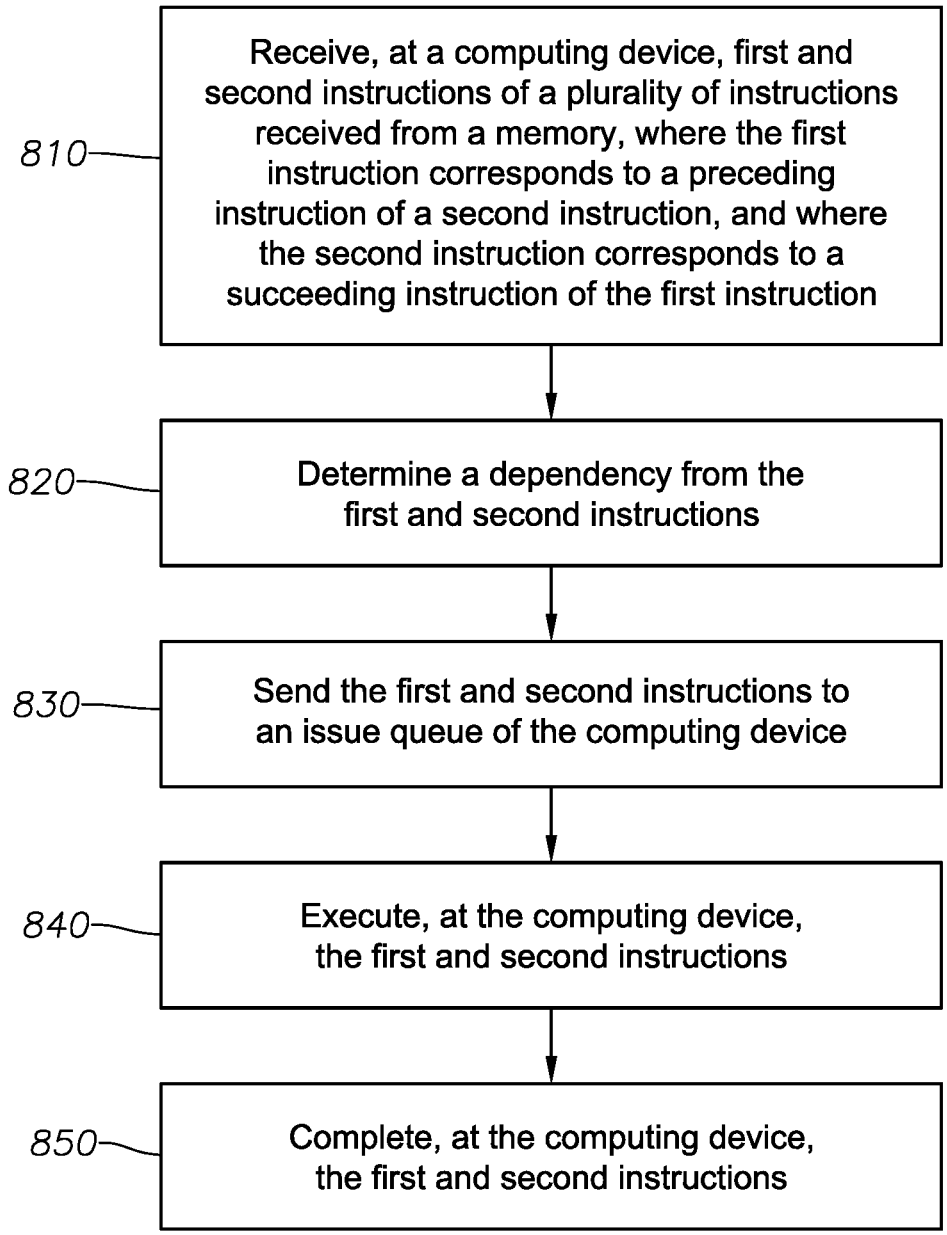
Figure 9:
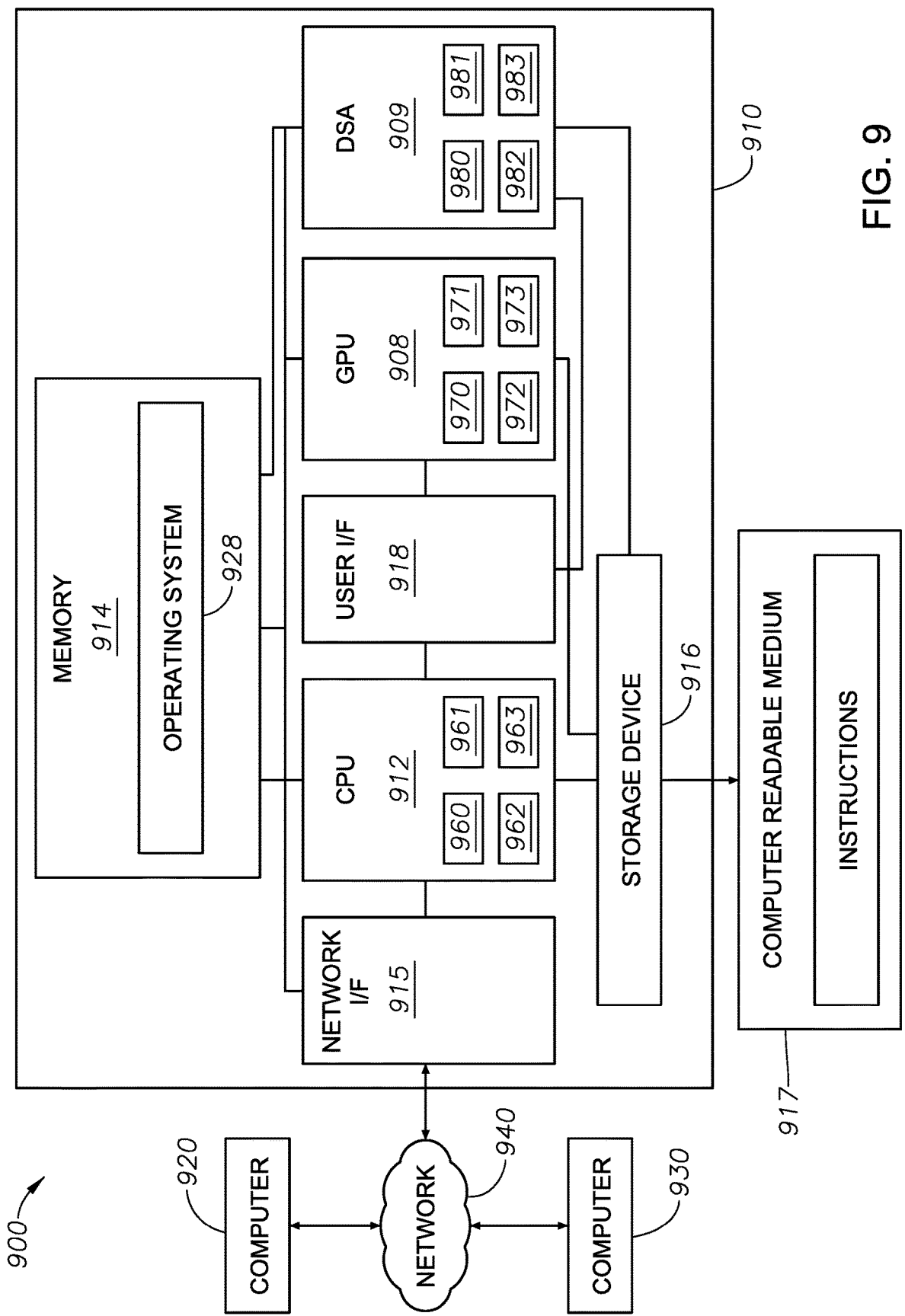
Figure 10:
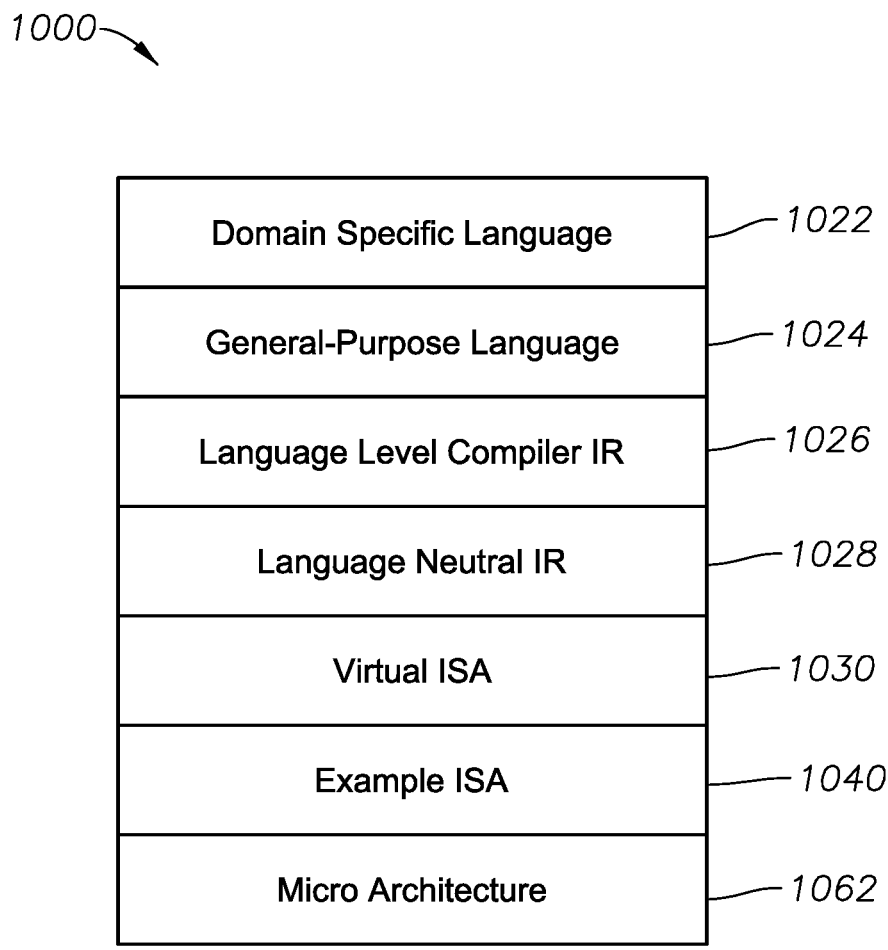

FIG. 1 illustrates example instructions.
FIG. 2 illustrates a graphical representation.
FIG. 3 illustrates a graphical representation in accordance with implementations of various techniques described herein.
FIGS. 4A-4C illustrate example instructions.
FIG. 5A illustrates the example instructions of FIG. 4B.
FIGS. 5B-5C illustrate example instructions in accordance with implementations of various techniques described herein.
FIG. 6 is an example diagram in accordance with implementations of various techniques described herein.
FIG. 7 is a particular illustrative aspect of methods in accordance with implementations of various techniques described herein.
FIG. 8 is a particular illustrative aspect of methods in accordance with implementations of various techniques described herein.
FIG. 9 is a block diagram in accordance with implementations of various techniques described herein.
FIG. 10 is a diagram in accordance with implementations of various techniques described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

V. DETAILED DESCRIPTION

According to one implementation of the present disclosure, a method to produce an instruction set architecture (ISA) extension for definition and enforcement of an ordered constraint is disclosed. In a particular implementation, the method includes identifying a first instruction as a preceding instruction; identifying a second instruction as a succeeding instruction; defining a dependency based on the identified first and second instructions, wherein the dependency corresponds to a predetermined ordered constraint; and generating, at a central processing unit (CPU), complimentary parameters indicating the dependency of the first and second instructions.

According to another implementation of the present disclosure, a method of dynamic operation (i.e., out-of-order execution) is disclosed. In a particular implementation, the method includes receiving, at a computing device, first and second instructions of a plurality of instructions obtained from a memory, where the first instruction corresponds to a preceding instruction of a second instruction, and where the second instruction corresponds to a succeeding instruction of the first instruction; determining a dependency of the first and second instructions; sending the first and second instructions to an issue queue of the computing device; executing, at the computing device, the first and second instructions; and completing, at the computing device, the first and second instructions.

According to another implementation of the present disclosure, an apparatus includes a computer-readable storage medium; at least one processor; and program code stored on the computer-readable storage medium and configured upon execution by the at least one processor to: (1) receive, at a computing device, first and second instructions of a plurality of instructions obtained from a memory, wherein the first instruction corresponds to a preceding instruction of a second instruction, and wherein the second instruction corresponds to a succeeding instruction of the first instruction; (2) determine a dependency of the first and second instructions; (3) send the first and second instructions to an issue queue of the computing device; (4) execute, at the computing device, the first and second instructions; and (5) complete, at the computing device, the first and second instructions.

Particular implementations of the present disclosure are described below with reference to the drawings. In the description, common features are designated by common reference numbers throughout the drawings.

Advantageously, systems and methods of the present disclosure ensure a store operation may be persistently complete (i.e., when a value has been written to memory (e.g., NVMM)). Moreover, systems and methods described herein provide for various hardware implemented instructions (e.g., instruction set architecture (ISA) instruction "keys" (e.g., instructions of the central processing unit (CPU), graphics processing unit (GPU), domain-specific acceleration unit (DSA)) as well as software and hardware combination interface instructions (or representations) (including: domain-specific language, general-purpose language, language-level compiler intermediate representation (IR), language-neutral IR, virtual ISA, a microinstruction set architecture interface)) for store, load, atomic, and cache maintenance operations that allow for the definition, determination, and enforcement of explicit dependencies (i.e., dependencies) to other instructions. Accordingly, such updated instructions (with updated extensions) would no longer require Data Synchronization Barriers (DSBs) in crash-consistent applications. Rather, a programmer or computer system may specify with precision the particular instructions that would have be linked together through dependencies.

Advantageously, inventive systems and methods provide for a set of identification tags (i.e., explicit dependency keys (EDKs), persistence dependency keys, complimentary parameters) to convey explicit dependencies (i.e., dependency). In various implementations, a given instruction may be a "producer" instruction (i.e., an instruction that defines an explicit dependency, a preceding instruction), a "consumer" instruction (i.e., an instruction that utilizes an explicit dependency, a succeeding instruction), or both. For instance, a particular key would not hold data, but instead would act as a trigger for subsequent succeeding instructions that may depend on the key. Hence, an instruction that is a consumer instruction cannot be completed before a prior instruction being the corresponding preceding instruction has been completed. In addition, it would also be possible for multiple instructions to "consume" (follow) a key "produced" by a particular instruction (i.e., a preceding instruction).

In various implementations, crash-consistent applications may insert several barriers into program code to ensure the ordering of "stores" to NVMM occurs in a particular desired order. (As described herein, it may be defined that a store operation would be "persistently complete" when its value has been written to NVMM.) Also, it may be noted that due to the presence of caches, a store operation having been persistently completed may not be the same as when the store operation value may be visible in a computer memory system.

In one example, in order to ensure a "store" has persistently completed, in computing systems (e.g., AArch64 systems), two additional instructions may be inserted alongside a traditional store: 1) Data or Unified Cache Line Clean by VA to PoP (DC CVAP) and 2) Full System Data Synchronization Barrier (DSB SY) (i.e., DSB). In certain cases, the DC CVAP may ensure the "store" would be "forced" to be "written back" to the NVMM, while a DSB would block subsequent instructions from execution until all previous memory operations (including the DC CVAP) have completed.

Also, in one common programming paradigm (that may be utilized with crash-consistent applications), "logging" may be performed to allow a disjoint set of stores to appear to be persistently completed atomically. In "undo-logging" (e.g., the type of logging most commonly performed within crash-consistent applications), the application would place an original value that would be overwritten into a log before a data structure may itself be modified. Hence, while performing undo-logging, it is important to ensure that the log is persistently completed before the original value is mutated.

Referring to FIG. 1, an example program code 100 to perform undo-logging is shown. As illustrated, two stores (instructions W[A]=new and DC CVAP[A]) and their corresponding log updates (instructions W[Log A]=[A] and DC CVAP [Log A]) may be executed. After a log is written, a DSB would be utilized to ensure a persistent state may be maintained. As shown in FIG. 1, as an example, the DSB would be inserted between one log update and store. However, as will be described with reference to FIGS. 4A-4C below, the insertion of the DSB would have a "side effect" of also limiting the ordering of other instructions within the execution. Nevertheless, in an optimized and efficient operation (e.g., as shown with reference to FIGS. 5A-5C), it would be desired that both the log updates would be performed in parallel, but due to the presence of the DSB this desired outcome would not happen.

FIG. 2 illustrates the example program code 100 of FIG. 1 as a graphical representation 200. In FIG. 2, one example scenario that would previously have required the use of DSBs is shown. For instance, various example instructions 210 may be represented by ellipses. In a first ordering, the instruction, "DC CVAP [Log A]" 212 would be required to be ordered with the instruction "Store [A]" ("W[A]") 214 (as indicated by the dashed-line arrow). Moreover, in other orderings, instructions "Store [Log A]" ("W[Log A]") 216 and "DC CVAP [Log A]" 212, as well as the instructions "Store [A]" 214 and "DC CVAP [A]" 218 would also be required to be ordered with one another. However, unlike the first ordering, these other orderings may be achieved without a barrier 240 (e.g., DSB) because such instructions have data dependency (as indicated by the solid arrow). Nevertheless, in this example, a barrier 240 (e.g., DSB) would previously have been required to be placed between the first ordering between the instructions "DC CVAP [Log A]" 212 and "Store [A]" ("W[A]") 214 (as indicated by the solid line). Consequently, the instructions of the other orderings would not have ordering constraints, but because the barrier 240 would be required for the first ordering, the extent that the instructions of the other orderings may be re-ordered would be limited.

Referring to FIG. 3, the example program code of FIG. 1 is now shown as graphical representation 300 in accordance with various inventive implementations as described herein. Similar to FIG. 2, the various example instructions 310 are represented by ellipses. In contrast to FIG. 2, in FIG. 3, according to inventive aspects, the instructions are illustrated with explicit dependencies (i.e., dependencies) instead of a barrier (i.e., DSB). For instance, the instructions would include the following format (i.e., explicit dependency key (EDK) complementary parameters, Instruction Set Architecture (ISA) extension): [producer #, consumer #] instruction. As shown in FIG. 3, the instructions "[1,–] DC CVAP [Log A]" 312 and "[–,1] Store [A]" (i.e., "[–,1]W[A]") 314 may now be ordered by virtue of the dependencies. Thus, the instruction "[1,–] DC CVAP [Log A]" 312 would "produce" the explicit dependency that may be "consumed" by the instruction "Store [A]" 314. Accordingly, the two instructions would be ordered. Moreover, similar to FIG. 2, in other orderings, instructions Store [Log A] ("W[Log A]") 316 and DC CVAP [Log A]312, as well as the instructions "Store [A]" 314 and "DC CVAP [A]" 318 that are also required to be ordered together would not require an explicit dependency because such instructions have data dependency (as indicated by the solid arrow).

In certain implementations, the EDK complementary parameters may be encoded into the ISA by either a programmer or a computer system. In one example operation, a methodology to produce the EDK complementary parameters is described with reference to FIG. 7 below. Accordingly, certain inventive aspects as described herein allow for both the definition and enforcement of an ordered constraint. Moreover, such inventive aspects also have the capacity to allow for greater flexibility in instruction execution re-orderings (as described in further detail with reference to FIGS. 5A-C).

Referring to FIG. 4A-C, example program code 400 (i.e., instructions) expanding on the program code 100 of FIG. 1 is shown in an example operation, implementation and with possible instruction re-orderings. In FIG. 4A, an example operation to write to two distinct locations "A" and "B" is shown, while FIG. 4B illustrated the instructions required to implement such an operation. Also, FIG. 4C depicts the possible re-ordering of the instructions given the constraints of the DSBs 440. Consequently, as illustrated, by the use of DSBs 440, the possible re-orderings may be limited to swapping the order of the instructions W[A]=new and DC CVAP[A] with that of W[Log B]=[B} and DC CVAP[Log B]. Hence, the use of DSBs 440 can restrict the flexibility of order execution, thus resulting in costly delay of out-of-order execution in computer architecture.

Referring to FIG. 5A-C, the example program code 400 (i.e., instructions) as shown in FIG. 4B is reproduced in FIG. 5A and is illustrated in comparison to the example program code 500 (i.e., instructions) as shown in FIG. 5B. Further, in FIG. 5C, the possible re-orderings are shown utilizing the novel possible re-ordering of the program code 500. In FIG. 5B, the instructions 500 include defined ISA extensions (i.e., explicit dependency keys (EDKs), parameters in instruction operand fields) (e.g., Line 2: "[1,–]" and Line 3 "[–,1] and Line 6: "[2,–]" and Line 7: "[–,2]"). By implementing these defined ISA extensions, according to inventive aspects, specific ordered constraints may be enforced without requiring DSBs. Moreover, as illustrated in FIG. 5C, as there are no DSBs involved, advantageously, greater flexibility may be realized in possible re-orderings. For instance, the instructions: "W[Log A]" 316, "DC CVAP [Log A]" 312 and "W[A]=new 314, "DC CVAP [A]" 318 may be performed in parallel with "W[Log B]" 516, "DC CVAP [Log B]" 512 and "W[B]=new 514, "DC CVAP [B]" 518. Advantageously, the capacity to execute various instructions in parallel would allow for greater efficiency in high-performance microprocessors.

Referring to FIG. 6, an example operation 600 is shown in accordance with various implementations as described herein. Advantageously, the operation 600 may be performed for different types of instructions including store, cache maintenance, atomic, and load instructions.

In certain implementations, initially, at step 610, first and second instructions (e.g., DC CVAP [Log A] 312, and W[A] 312) of a plurality of instructions previously received from a memory (e.g., memory 914, storage device 916, computers 920, 930 in FIG. 9) may be "fetched" (i.e., received) to a computing device 602 (e.g., processing units (e.g., central processing unit (CPU), graphics processing unit (GPU), domain-specific acceleration unit (DSA), micro-architecture processing units (μISA processing units) as described with reference to FIGS. 9-10 or software and hardware combination interfaces (as described with reference to FIG. 10). For instance, the first instruction (e.g., CVAP [Log A] 312) may correspond to a preceding instruction (i.e., a producer instruction) of the second instruction (e.g., W[A] 314), while the second instruction (e.g., W[A] 314) may correspond to a succeeding instruction (i.e., a consumer instruction) of the first instruction (e.g., CVAP [Log A] 312). It is expressly noted that while the example operation 600 is described with reference to the first and second instructions it is more generally applicable with reference to the plurality of instructions that may be preceding instructions, succeeding instructions, or both.

Next, at steps 612 and 614, the first and second instructions 312, 314 may be decoded and dispatched to the issue queue 660. At the decoding step, step 612, a dependency (a persistence dependency, a "link") may be determined (i.e., decoded) from the first and second instructions 312, 314. In certain instances, decoding a dependency may include matching, by a mapping table 963, 973, 983 (as shown with reference to FIG. 9), (i.e., explicit-dependency key (EDK) mapping table), respective first and second keys (e.g., EDK complementary parameter values stored in instruction operand fields) (e.g., [1,–], [–,1]) corresponding to the first and second instructions 312, 314. In certain implementations, matching the first and second instructions include: in response to decoding the first instruction, the first register being associated to the decoded first instruction; and in response to decoding the second instruction, the mapping table being configured to identify whether the second instruction includes a complementary parameter.

At step 616, the first and second instructions 312, 314 would wait in the issue queue 660 until memory and register key dependencies are ready. Next, at step 618, the first and second instructions 312, 314 may be executed (i.e., "issued"). At this step, in the CPU 602, memory address calculations and/or memory instructions would be executed, as well as load instructions would retrieve memory values. At step 620, the first and second instructions 312, 314 are committed (i.e., retired) to the memory (e.g., memory 914, storage device 916, computers 920, 930 in FIG. 9) and/or to a register file 962, 972, 982 (as shown with reference to FIG. 9) of the CPU. In certain implementations, this step would be performed in program order (e.g., an instruction would commit only once all preceding instructions have also committed). Next, at step 622, in some cases, for atomic, store, and cache maintenance instructions, a writeback (i.e., modification) of the memory would be performed last. Consequently, prior the commit step 620, it may not be guaranteed that the first and second instructions would finish.

Moreover, the enforcement of the explicit persistence dependencies (i.e., dependencies) would occur prior to instruction interactions with memory (e.g., memory 914, storage device 916, computers 920, 930 in FIG. 9). For example, for load instructions, explicit dependency enforcement would occur before the instruction execution step 618 (e.g., at the issue queue step 616). Moreover, for atomic, store, and cache maintenance instructions as well, explicit dependency enforcement may be performed either at the issue queue step 616 or may be delayed until the writeback step 622 (as such instructions do not in fact modify memory until the writeback step).

Furthermore, in the device 602, the dependencies may also be tracked throughout the lifetimes of each of the plurality of instructions. This may be accomplished internally in the device 602, where each instruction would be "aware" of what other instructions may be linked to. For instance, within a pipeline, each instruction would have an identifying tag (i.e., an instruction operand field) as well as other fields that would denote other dependent aspects. Advantageously, the explicit dependencies would be an added field to in-flight instructions denote whether there are dependencies and for which particular instructions.

In certain implementations, additional instruction formats of may be included as other instructions of the plurality of instructions for various optimizations. In a first case, the instruction: CompleteExplicitDependenceBarrier may be implemented to prevent subsequent instructions that define or apply dependencies to execute until the received instructions of the plurality of instructions that are associated as preceding or succeeding instructions are completed.

In a second case, the instruction: *[EDK #] SelectExplicitDependenceBarrier* may be implemented to prevent subsequent instructions that define or apply an indicated key (an indicated EDK) to execute until the received instructions of the plurality of instructions that define or apply the indicated key are completed.

In a third case, the instruction: *[EDK def #, EDK use_1 #, EDR use_2 #] ExplicitDependenceJoinBarrier* may be implemented as a succeeding instruction of two other instructions of the plurality of instructions, and where this instruction may be arranged to be completed after the two other instructions are completed.

Referring to FIG. 7, an example method 700 (i.e., method 700) is shown in accordance with various implementations as described herein. The method 700 may be used to produce an instruction set architecture (ISA) extension for definition and enforcement of an ordered constraint. Advantageously, such an example method may be implemented with the program instruction implementations as described with reference to FIGS. 3 and 5 as well as the computing device operation 600 in FIG. 6, the computer system 900 as described with reference to FIG. 9, and computing devices (e.g., processing units (e.g., central processing unit (CPU), graphics processing unit (GPU), domain-specific acceleration unit (DSA), a micro-ops (micro-operations) instruction set architecture (μISA) processing unit for micro-architecture (i.e., an interface for a microinstruction set architecture interface) or any other ISA-based processing unit or machine interface, as described with reference to FIGS. 9-10 or machine interfaces (as described with reference to FIG. 10).

At block 710, a first instruction may be identified as a preceding instruction ("producer instruction"). As one example, with reference to FIGS. 3, 5 and 6, the example instruction [1,–] DC CVAP [Log A] 312 may be identified as a preceding instruction.

At block 720, a second instruction may be identified as a succeeding instruction ("consumer instruction"). As one example, with reference to FIGS. 3, 5 and 6, the example instruction [–, 1]W[A] 314 may be identified as a succeeding instruction.

At block 730, a dependency (i.e., a persistence dependency, link) based on the identified first and second instructions may be defined such that the dependency would correspond to a predetermined ordered constraint. As one example, with reference to FIGS. 3, 5, 6, at the decoding step 612, the identified first and second instructions 312, 314 may be "linked". As one example, decoding a dependency (i.e., "linking") may include matching, by a mapping table (i.e., explicit-dependency key (EDK) mapping table), respective first and second keys (e.g., EDK complementary parameter values stored in instruction operand fields) (e.g., [1,–], [–,1]) corresponding to the first and second instructions 312, 314.

At block 740, at a central processing unit (CPU), complementary parameters (i.e., a specific explicit dependence key (EDK) values) indicating the dependency of the first and second instructions may be generated. As one example, with reference to FIGS. 3, 5, 6, at the decoding step 612 in the CPU, for the identified first and second instructions 312, 314, complementary parameters (e.g., [1,–], [–,1]) indicating the dependency may be generated.

In additional blocks, with reference to FIGS. 3, 5, and 6, first (e.g., a first EDK, a register) (i.e., an input for the EDK mapping table 963, 973, 983) (e.g., an EDK producer key) and second parameters of the complementary parameters may be stored in respective first and second internal storages (960, 961; 970, 971; 980, 981) (as shown with reference to FIG. 9) of the CPU 602. Also, the first and second instructions 312, 314 may be each be updated to include the complementary parameters (as an instruction operand field of the instructions).

Referring to FIG. 8, an example operation for dynamic execution (i.e., out-of-order execution) is shown in accordance with various implementations described herein. The method 800 may be used to optimize computer architecture instruction cycles in high performance central processing units. Advantageously, such an example method may be implemented with the program instruction implementations as described with reference to FIGS. 3 and 5 as well as the central processing unit operation 600 in FIG. 6, the computer system 900 and computing devices corresponding to processing units and interfaces 1000, as described with reference to FIGS. 9-10.

At block 810, first and second instructions (of a plurality of instructions previously received from a memory) may be received ("fetched") to a computing device where the first instruction corresponds to a preceding instruction of a second instruction, and wherein the second instruction corresponds to a succeeding instruction of the first instruction. For example, with reference to step 610 in FIG. 6, first and second instructions 312, 314 may be received ("fetched") to a computing device (e.g., 910, 920, 930, 1000, and defined as example hardware and software and hardware combinations) (e.g., processing units (i.e., processing elements, ISA processing units) (e.g., central processing unit (CPU), graphics processing unit (GPU) 908, domain specific acceleration unit (DSA), among others) or machine interfaces corresponding to different interfaces (e.g., domain-specific language 1022, general-purpose language 1024, language-level compiler intermediate representations (IR), 1026, language-neutral IR 1028, virtual ISA 1030, example ISA 1040, a micro-ops (micro-operations) instruction set architecture (µISA) processing unit for micro-architecture 1062 (i.e., a machine interface for a microinstruction set architecture interface) or any other ISA-based processing unit).

At block 820, a dependency (a persistence dependency, a "link") may be determined (decoded) from the first and second instructions. For example, with reference to step 612 in FIG. 6, a dependency (a persistence dependency, a "link") may be determined (i.e., decoded) from the first and second instructions 312, 314.

At block 830, the first and second instructions may be dispatched (i.e., sent) to an issue queue (i.e., an instruction buffer) of the computing device. For example, with reference to step 614 in FIG. 6, the first and second instructions 312, 314 may be dispatched to the issue queue 660.

At block 840, the first and second instructions may be executed (i.e., issued). For example, with reference to step 618 in FIG. 6, the first and second instructions 312, 314 may be executed (i.e., "issued") at the computing device 602.

At block 850, at the computing device, the first and second instructions may be completed. For example, with reference to step 622 in FIG. 6, the first and second instructions 312, 314 may be completed ("write back") at the computing device 602 (e.g., a write-back buffer (i.e., a store buffer) or a retirement register).

In additional blocks, for example, the first and second instructions may be committed (i.e., retired) to the memory and to a register of the computing device. For example, with reference to step 620 in FIG. 6, the first and second instructions 312, 314 are committed (i.e., retired) to the memory (e.g., memory 914, storage device 916, computers 920, 930 in FIG. 9) and/or to a register file of the computing device 602.

Referring to FIG. 9, an example computer system 900 is shown in accordance with various implementations as described herein. FIG. 9 illustrates example hardware components in the computer system 900 that may be used to determine, define, and enforce ordered constrains in an ISA. In FIG. 9, in certain implementations, the example computer system 900 (e.g., networked computer system and/or server) may include software instructions (e.g., instructions 312, 314 of the plurality of instructions) and execute software based on the procedure as described with reference to the procedures 600, 700 and 800 as described with reference to FIGS. 6, 7, and 8 as well as computing devices corresponding to interfaces 1000 with reference to FIG. 10.

The procedures 600 and 700 may be stored as program code as instructions 917 in the computer readable medium 918 of the storage device 916 (or alternatively, in memory 714) that may be executed by the CPU 912 of the computer 910, or networked computers 920, 930, other networked electronic devices (not shown) or a combination thereof. In certain implementations, each of the computers 910, 920, 930 may be any type of computer, computer system, or other programmable electronic device. Further, each of the computers 910, 920, 930 may be implemented using one or more networked computers, e.g., in a cluster or other distributed computing system.

In certain implementations, the system 900 may be used with semiconductor integrated circuit (IC) designs that contain all standard cells, all blocks or a mixture of standard cells and blocks. In a particular example implementation, the system 900 may include in its database structures: a collection of cell libraries, one or more technology files, a plurality of cell library format files, a set of top design format files, one or more Open Artwork System Interchange Standard (OASIS/OASIS.MASK) files, and/or at least one EDIF file. The database of the system 900 may be stored in one or more of memory 914 or storage devices 916 of computer 910 or in networked computers 920, 920.

In one implementation, the computer system 900 includes one or more of a central processing unit (CPU) 912, an example graphics processing unit (GPU) 908, an example domain-specific acceleration unit (DSA) 909 (e.g., DSA for graphics, machine learning (deep neural networks), simulation, bioinformatics, image processing, etc.), having at least one hardware-based processor coupled to a memory 914. The memory 914 may represent random access memory (RAM) devices of main storage of the computer 910, supplemental levels of memory (e.g., cache memories, non-volatile or backup memories (e.g., programmable or flash memories)), read-only memories, or combinations thereof. In addition to the memory 914, the computer system 900 may include other memory located elsewhere in the computer 710, such as cache memory in the CPU 912, GPU 908, DSA 909, as well as any storage capacity used as a virtual memory (e.g., as stored on a storage device 916 or on another computer coupled to the computer 910, including virtual ISA 1030 described with reference to FIG. 10). In one example (not shown), the computer system may include a micro-ops ISA (µISA) processing unit for micro-architecture (as described with reference to FIG. 10 in below paragraphs).

The computer 910 may further be configured to communicate information externally. To interface with a user or operator (e.g., a circuit design engineer), the computer 910 may include a user interface (I/F) 918 incorporating one or more user input devices (e.g., a keyboard, a mouse, a touchpad, and/or a microphone, among others) and a display (e.g., a monitor, a liquid crystal display (LCD) panel, light emitting diode (LED), display panel, and/or a speaker, among others). In other examples, user input may be received via another computer or terminal. Furthermore, the computer 910 may include a network interface (I/F) 915 which may be coupled to one or more networks 940 (e.g., a wireless network) to enable communication of information with other computers and electronic devices. The computer 910 may include analog and/or digital interfaces between the CPU 912, GPU 908, DSA 909, and each of the components 914, 915, 916, and 918. Further, other non-limiting hardware environments may be used within the context of example implementations.

The computer 910 may operate under the control of an operating system 928 and may execute or otherwise rely upon various computer software applications, components, programs, objects, modules, data structures, etc. (such as the programs associated with the procedure 600 and 700 and related software). The operating system 928 may be stored in the memory 914. Operating systems include, but are not limited to, UNIX® (a registered trademark of The Open Group), Linux® (a registered trademark of Linus Torvalds), Windows® (a registered trademark of Microsoft Corporation, Redmond, Wash., United States), AIX® (a registered trademark of International Business Machines (IBM) Corp., Armonk, N.Y., United States) i5/OS® (a registered trademark of IBM Corp.), and others as will occur to those of skill in the art. The operating system 928 in the example of FIG. 9 is shown in the memory 914, but components of the aforementioned software may also, or in addition, be stored at non-volatile memory (e.g., on storage device 916 (data storage) and/or the non-volatile memory (not shown). Moreover, various applications, components, programs, objects, modules, etc. may also execute on one or more processors in another computer coupled to the computer 910 via the network 940 (e.g., in a distributed or client-server computing environment) where the processing to implement the functions of a computer program may be allocated to multiple computers 920, 930 over the network 940.

Referring to FIG. 10, example interfaces 1000 for (ISA-based computing devices) in computer systems (e.g., each of computers 910, 920, 930 of computer system 900) is shown. As shown, FIG. 10 illustrates various interface types (i.e., interfaces, ISA interfaces) that correspond to different ISA-based computing devices (i.e., machine-interfaces (vertically) or (processing units (horizontally)), where each "ISA-based" computing device may be a programmable computing device. Moreover, both machine-interfaces and processing units may be "instruction-based". As defined herein, instruction-based refers to the capacity of the computing device to be programmable (i.e., its functionality can be changed even after it has been manufactured by programming the computing device).

In certain aspects, such vertical computing devices (i.e., hardware and software combination machine-interfaces, machine interfaces) include the "stacks" below each interface type (as described in below paragraphs) that can be implemented in hardware. Accordingly, each machine interface may be situated at a boundary between software (i.e., above a machine interface) and hardware (i.e., below the machine interface). Also, in example cases, machine interfaces may be implementable with a set of operations (i.e., instructions) that can be executed by a machine.

In one instance, the example ISA 1040 corresponds to an ISA that relates to the machine interface for the CPU, and can define the interface between software and hardware. Similarly, each of the different interface types, as described below, include a respective concrete hardware implemented machine-interface.

In certain implementations, similar to the ISA as described above with reference to FIGS. 1-9, the ISA may extend "horizontally" to cover non-CPU computing devices such as graphics processing units (GPUs) (e.g., GPU ISAs such as Single Instruction Multiple Threads (SIMT), domain-specific acceleration unit (DSAs) (e.g., DSA ISAs for graphics, deep learning (deep neural networks), simulation, bioinformatics, image processing, etc.) or other ISA-based processing units, as well as CPU ISAs (e.g., including reduced instruction set computer (RISC), complex instruction set computer (CISC), very-long instruction word (VLIW), single instruction, multiple data (SIMD), explicit data graph execution (EDGE), etc.). Collectively, when the ISA may be extended horizontally, such computing devices are defined herein as "processing units".

In other implementations, the ISA may extend "vertically" to cover other types of computing devices defined as machine interfaces. For examples, each of the following types of interfaces correspond to a respective machine interface. The different types of interfaces (i.e., interface types) may include: domain-specific language implementations 1022 (e.g., Tensor Flow® (a registered trademark of Google LLC (Alphabet Corp.) Santa Clara, Calif., United States) allowing for application productivity, for example, for the computer system 900; general-purpose language 1024 (e.g., CUDA® (Compute Unified Device Architecture, a registered trademark of Nvidia Corp., Santa Clara, Calif., United States) allowing for application performance for the computer system 900; language-level compiler intermediate representation (IR) 1026 (e.g., TVM, an automated end-to-end optimizing compiler for deep learning, compiler deep learning stack) for language innovation for the computer system 900; and language-neutral IR 1028 (e.g., multi-level intermediate representation (MLIR), low level virtual machine (LLVM) IR, and EDGE® (a registered trademark of Microsoft Corporation, Redmond, Wash., United States) for compiler investments for the computer system 900.

In some cases, certain interfaces (i.e., interface types) may include: virtual ISAs 1030 such as, for example: TIMI® (Technology Independent Machine Interface, a registered trademark of IBM); PTX® (Parallel Thread Execution, a registered trademark of Nvidia Corp., Santa Clara, Calif., United States); and Java bytecode (registered trademark of Oracle Corp., Redwood City, Calif., United States). Advantageously, such virtual ISAs 130 may allow for object-code portability across various ISAs, for example, for the computer system 900.

In other cases, certain interfaces (i.e., interface types) may include hardware ISAs 1062, such as microarchitecture innovation (i.e., a microinstruction set architecture interface) (e.g., CISC that can leverage uarch (i.e., micro-architecture) from RISC implementations). In certain examples, such hardware ISAs 1062 may include: VLIW cores (from Transmeta Corp. Santa Clara, Calif., United States), GPU implementations (e.g., Nvidia GPUs), x86 Microcode® (i.e., microcode that runs inside x86 processors; a registered trademark of Intel Corp., Santa Clara, Calif., United States). Moreover, for further cases, any other-type having a defined set of operations may also include a respective corresponding machine-interface.

In the above cases, the interfaces may be between two consecutive layers in the software "stacks" above a traditional example ISA layer 1040. However, the hardware utilized (i.e., the corresponding machine interface) can be free to implement for any of such interfaces, from virtual ISAs 1030 to the various languages 1022, 1024, 1026, and 1028. For instance, various language-specific machines can run on particular types of machine interfaces (e.g., LISP or ADA machines (LISP or ADA general purpose computers)).

In one example, inventive aspects as related to "tracking" (fine-grained) dependencies (as described in above paragraphs) explicitly can extend to bytecodes (e.g., Java, C#) and can be considered as instruction sets for virtual machines (e.g., a "higher" level (virtual) ISA). In another example, such inventive aspects may also apply to non-CPU ISA-based processing circuitries (e.g., GPU, DSA)). In certain examples, inventive aspects may "relax" memory models (e.g., load/store instructions to be re-ordered in memory) so as to allow for better performance of the processing elements (e.g., CPU, GPU, DSA).

Advantageously, inventive aspects of the present disclosure allow for "fine-grain" ordering (i.e., fine-grain control mechanisms) with respect to the type and process that the reordering can happen. In certain cases, customized and enforced ordering can occur above, below, or in parallel. Hence, the re-orderings can improve performance in fine-grain dependency tracking. Moreover, such re-orderings, can improve underlying efficiency in operations (both for applications of corresponding machine interfaces of interfaces and processing elements (i.e., processing units)). Furthermore, software and hardware combination interfaces and processing elements may be designed to impose its own barriers/restrictions or lack thereof.

Advantageously, for certain cases, as the current boundaries between software and hardware may "evolve", such inventive methodologies as described herein may be implemented for various machine interfaces and processing elements. In addition, such inventive methodologies allow for greater flexibility, less restrictions, and better execution for the different types of interface instructions. Hence, the hardware/software combination interfaces allow for "richer" and more robust capabilities (e.g., fine-grain control, can execute with greater choice and control, and with greater precision in instruction ordering execution).

As illustrated, certain implementations have been provided in FIGS. 1-10, whose redundant description has not been duplicated in the related description of analogous cell layout diagrams. It is expressly incorporated that the same instructions or other elements with identical symbols and/or reference numerals are included in each of embodiments based on its corresponding figure(s).

Although one or more of FIGS. 1-10 may illustrate systems, apparatuses, or methods according to the teachings of the disclosure, the disclosure is not limited to these illustrated systems, apparatuses, or methods. One or more functions or components of any of FIGS. 1-10 as illustrated or described herein may be combined with one or more other portions of another of FIGS. 1-10. Accordingly, no single implementation described herein should be construed as limiting and implementations of the disclosure may be suitably combined without departing form the teachings of the disclosure.

Aspects of the present disclosure may be incorporated in a system, a method, and/or a computer program product. The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. For example, the memory 914, the storage device 916, or both, may include tangible, non-transitory computer-readable media or storage devices.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, a special purpose computer, or other programmable data processing apparatus to produce a machine, such that the instructions, which execute via the processor of the computer or other programmable data processing apparatus. The machine is an example of means for implementing the functions/acts specified in the flowchart and/or block diagrams. The computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagrams.

The computer-readable program instructions may also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement the functions/acts specified in the flowchart and/or block diagrams.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in a block in a diagram may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below. Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method comprising:
   identifying a first instruction of a plurality of instructions as a preceding instruction;
   identifying a second instruction of the plurality of instructions as a succeeding instruction;
   defining a dependency based on the identified first and second instructions, wherein the dependency corresponds to a predetermined ordered constraint
   generating, at a computing device, complementary parameters indicating the dependency of the first and second instructions,
   selecting a stage of dependency enforcement based on an instruction-type of the first and second instructions, wherein stages of dependency enforcement comprise at least one of an issue queue or a writeback buffer, and
   executing, at the issue queue or the writeback buffer of the computing device, the dependency enforcement of the first and second instructions based on the instruction-type.

2. The method of claim 1, wherein the computing device comprises at least one of a processing unit or a machine interface.

3. The method of claim 2, wherein the processing unit comprises one of: a central processing unit (CPU), graphics processing unit (GPU), domain-specific acceleration unit (DSA), or other instruction-based processing unit.

4. The method of claim 2, wherein the machine interface comprises one of: a machine interface for a domain-specific language interface, a machine interface for a general-purpose language interface, a machine interface for a language-level compiler intermediate representations (IR) interface, a machine interface for a language-neutral IR interface, a machine interface for a virtual instruction set architecture (ISA) interface, a machine interface for an instruction set architecture (ISA) interface, a machine interface for a micro-instruction set architecture interface, or a machine interface for a defined set of operations interface.

5. The method of claim 1, further comprising:
   storing a first parameter of the set of complementary parameters in a first internal storage of the computing device, and
   storing a second parameter of the set of complementary parameters in a second internal storage of the computing device.

6. The method of claim 1, further comprising:
   sending the first and second instructions to an issue queue of the computing device;
   completing, at the computing device, the first and second instructions; and
   generating updated first and second instructions, wherein the updated first and second instructions include respective first and second parameters of the set of complementary parameters.

7. The method of claim 1, wherein the complementary parameters comprise a same value stored:
   in the first instruction operand field of the preceding instruction, wherein the preceding instruction comprises at least two fields configured to store a set of complementary parameters, in the second instruction operand field of the succeeding instruction, wherein the succeeding instruction comprises at least two fields configured to store the set of complementary parameters, and wherein defining the dependency comprises:

determining, by the computing device, if an execution of the succeeding instruction is required to follow an execution of the preceding instruction.

8. The method of claim 1, wherein the first and second instructions comprise either load, store, atomic, or cache maintenance instructions.

9. The method of claim 1, wherein the first instruction corresponds to a second succeeding instruction.

10. The method of claim 1, wherein the second instruction corresponds to a second preceding instruction.

11. A method comprising:

receiving, at a computing device, first and second instructions of a plurality of instructions obtained from a memory, wherein the first instruction corresponds to a preceding instruction of a second instruction, and wherein the second instruction corresponds to a succeeding instruction of the first instruction;

determining a dependency of the first and second instructions;

determining an instruction-type of the first and second instructions;

selecting a stage of dependency enforcement based on the instruction-type, wherein stages of dependency enforcement comprise at least one of an issue queue or a writeback buffer;

sending the first and second instructions to the issue queue of the computing device;

executing, at the issue queue or the writeback buffer of the computing device, the dependency enforcement of the first and second instructions based on the instruction-type; and completing, at the computing device, the first and second instructions.

12. The method of claim 11, further comprising:

committing the first and second instructions to the memory and to a register file of the computing device.

13. The method of claim 11, wherein determining the dependency comprises:

matching, by a mapping table, respective first and second keys corresponding to the first and second instructions, wherein the respective first and second keys are configured to store complementary parameters corresponding to the first and second instructions, and wherein matching of the respective first and second keys corresponding to the first and second instructions comprises:

in response to decoding the first instruction, a first register is associated to the decoded first instruction; and in response to decoding the second instruction, the mapping table is configured to identify whether the second instruction includes a parameter of the complementary parameters.

14. The method of claim 11, wherein the dependency is tracked for the duration of the first and second instructions.

15. The method of claim 11, wherein the dependency is enforced in an issue queue or the write-back buffer.

16. The method of claim 11, further comprising:

receiving, at the computing device, a third instruction of the plurality of instructions, wherein the third instruction is arranged to prevent following instructions that define or apply dependencies to execute until the received instructions of the plurality of instructions that are associated as preceding or succeeding instructions are completed.

17. The method of claim 11, further comprising:

receiving, at the computing device, a third instruction of the plurality of instructions, wherein the third instruction is arranged to prevent following instructions that define or apply an indicated key to execute until the received instructions of the plurality of instructions that define or apply the indicated key are completed.

18. The method of claim 11, further comprising:

receiving, at the computing device, a third instruction of the plurality of instructions, wherein the third instruction corresponds to a succeeding instruction of two other instructions of the plurality of instructions, and wherein the third instruction is arranged to be completed after the two other instructions are completed.

19. The method of claim 11, wherein the instruction-type comprises either both load, store, atomic, or cache maintenance instructions, and wherein the first and second instructions are either preceding or succeeding instructions to other instructions.

20. An apparatus comprising:

a non-transitory computer-readable storage medium;

at least one processor; and program code stored on the computer-readable storage medium and configured upon execution by the at least one processor to:

receive, at a computing device, first and second instructions of a plurality of instructions obtained from a memory, wherein the first instruction corresponds to a preceding instruction of the second instruction, and wherein the second instruction corresponds to a succeeding instruction of the first instruction;

determine a dependency of the first and second instructions;

determine an instruction-type of the first and second instructions;

select a stage of dependency enforcement based on the instruction-type, wherein stages of dependency enforcement comprise at least one of an issue queue or a writeback buffer;

send the first and second instructions to the issue queue of the computing device;

execute, at the issue queue or the writeback buffer of the computing device, the dependency enforcement of the first and second instructions; and complete, at the computing device, the first and second instructions.

* * * * *